(12) United States Patent
Kawai et al.

(10) Patent No.: US 6,955,335 B2
(45) Date of Patent: Oct. 18, 2005

(54) THROTTLE DEVICE WITH COVER FOR INTERNAL ELEMENTS

(75) Inventors: Shinji Kawai, Aichi-ken (JP); Hisashi Kino, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 77 days.

(21) Appl. No.: 10/681,380

(22) Filed: Oct. 9, 2003

(65) Prior Publication Data

US 2004/0103736 A1    Jun. 3, 2004

(30) Foreign Application Priority Data

Oct. 9, 2002    (JP)    ............................. 2002-296625

(51) Int. Cl.$^7$ .......................................... F16K 31/02
(52) U.S. Cl. .............................. 251/129.11; 74/606 R; 411/508
(58) Field of Search ...................... 251/129.11, 129.12, 251/129.13; 74/606 R, 608, 612; 411/508, 411/910, 913; 24/297, 453; 123/337, 399; 220/4.02, 3.8, 241, 326, 784, 786, 788

(56) References Cited

U.S. PATENT DOCUMENTS 5,852,854 A * 12/1998 Pierrot et al. ................. 24/297
5,979,691 A * 11/1999 Von Holdt ................... 220/266
6,070,852 A *  6/2000 McDonnell et al. ..... 251/129.11
6,349,701 B1 *  2/2002 Sakurai et al. .............. 123/399
6,581,569 B2 *  6/2003 Arsic et al. ................. 123/399

FOREIGN PATENT DOCUMENTS

| JP | 2001132495 | 5/2001 |
|---|---|---|
| JP | 2001303979 | 10/2001 |

* cited by examiner

*Primary Examiner*—Edward K. Look
*Assistant Examiner*—John K. Fristoe, Jr.
(74) *Attorney, Agent, or Firm*—Dennison, Schultz, Dougherty & MacDonald (57) ABSTRACT

A throttle device includes a throttle body (1) and a cover (18) adapted to be mounted to the throttle body. A coupling device (13, 15; 51, 53) includes a first engaging portion (15; 51) disposed on one of the throttle body and the cover and a second engaging portion (13; 53) disposed on the other of the throttle body and the cover. The first and second engaging portions are engageable with each other when the throttle body and the cover is moved toward each other in a first direction, so that the throttle body and the cover are prevented from moving away from each other in a second direction opposite to the first direction. Means (1d; 1e: 53b) is provided for preventing accidental or unauthorized intentional access to the first or second engaging portions in order to disengage the first and second engaging portions.

18 Claims, 8 Drawing Sheets

THROTTLE DEVICE WITH COVER FOR INTERNAL ELEMENTS

This application claims priority to Japanese application serial number 2002-296625, which application is hereby incorporated by reference herein in its entirety.

BACKGROUND OF THE INVENTION

1. Field of the Invention

The present invention relates to a throttle device equipped with a throttle valve for controlling a flow rate of a fluid, in particular, to a throttle device having a cover that is coupled to a throttle body for covering internal elements, such as a reduction gear mechanism.

2. Description of the Related Art

In general, electronically controlled throttle devices include a throttle body and a cover that is mounted to an open end on one lateral side of the throttle body, so that a reduction gear mechanism, a throttle sensor and some other elements of the throttle body are accommodated within the throttle body protected from exposure to the outside. The reduction gear mechanism is adapted to transmit a rotation of an electric motor to a throttle valve in order to incrementally open and close the throttle valve. The throttle sensor is adapted to detect the opening angle of the throttle valve.

Japanese Laid-Open Patent Publication No. 2001-132495 (in particular FIG. 2 of this publication) teaches a conventional structure for mounting a cover to a throttle body. In this mounting structure, the cover is placed so as to abut an annular mount portion defining a lateral open end of the throttle body and is then fastened to the throttle body by means of a plurality of screws at multiple positions along a circumferential direction.

Japanese Laid-Open Patent Publication No. 2001-303979 (in particular FIG. 2 of this publication) teaches a different conventional mounting structure, in which a cover is coupled to a throttle body by using a resilient engaging mechanism or a snap-fit mechanism that includes a plural set of projections and a recesses that engage with each other.

However, the former conventional mounting structure using screws to secure the cover requires a number of separate parts. Therefore, the overall manufacturing costs are increased. In addition, it takes much time for the assembly process of inserting and correctly tightening the screws. Therefore, the mounting operation cannot be performed relatively efficiently.

In case of the latter conventional mounting structure using resilient members or typical snap-fit connections, the projection can be easily disengaged from their recesses by a manual operation or by using a simple tool. Therefore, if a cover has been intentionally or accidentally removed from a throttle body of a throttle device by a user, after being assembled and tested by the manufacturer, a possibility exists that when the cover is reinstalled by the user, misalignment or damage to the throttle sensor and other internal components may cause malfunctioning of the engine, or a reduction of life of the throttle body device.

SUMMARY OF THE INVENTION

Accordingly an object of the present invention is to provide a throttle device that can improve the facilitation of an assembly process of a throttle body to a cover and that can reliably prevent removal of the cover from the throttle body.

According to the present invention, a throttle device has a throttle body and a cover that is mounted to the throttle body. A coupling device includes a first engaging portion and a second engaging portion that are engageable with each other. The first engaging portion is disposed on one of the throttle body and the cover and the second engaging portion is disposed on the other of the throttle body and the cover. The first and second engaging portions are engageable with each other when the throttle body and the cover are moved toward each other in a first direction, and after engagement the throttle body and the cover are prevented from moving away from each other in a second direction opposite to the first direction. In addition, means are provided for preventing access to the first or second engaging portions in which such access would be for disengaging the first and second engaging portions.

Therefore, by simply moving the throttle body and the cover relative to each other in the first direction with the first engaging portion and the second engaging portion being aligned together, the first and second engaging portions engage with each other. As a result, the cover can be easily mounted to the throttle body. In particular, relative to a mounting process using screws or other fasteners, the assembly operation of the throttle body and the cover is simplified. The resulting efficiency of the assembling operation is improved.

In general, in the configuration of an electrically controlled throttle device, various parts, such as a reduction gear mechanism and a throttle sensor, are disposed within a throttle body and are covered by a separate cover. The reduction gear mechanism serves to transmit rotation of an electric motor to a throttle valve in order to incrementally open and close the throttle valve. The throttle sensor serves to detect the opening angle of the throttle valve. Therefore, if a user accidentally or intentionally removes the cover from the throttle body after the original manufacturing and testing processes, there exists the possibility that the throttle sensor may be misaligned or that the connections for the output signals may be damaged. Subsequently, the throttle valve sensor output signal may not accurately represent the opening angle of the throttle valve.

According to the teachings of the present invention, means are provided for restricting unauthorized attempts to disengage the first and second engaging portions through inhibiting access to the first or second engaging portions. Therefore, accidental or intentional removal of the cover can be reliably resisted.

Preferably, the first engaging portion is resiliently deformed and subsequently recovers towards its original configuration in order to engage the second engaging portion as the throttle body and the cover move closer relative to each other in the first direction. With this arrangement, the coupling device can be configured as a typical snap-fit mechanism, so that the engagement between the first and second engaging portions can be reasonably maintained.

Preferably, the prevention means serves to prevent an unauthorized operation of the first engaging member.

In one embodiment of the present invention, the second engaging portion includes an engaging hole that has an axis substantially parallel to the first and second directions. The engaging hole defines an engaging surface that extends in a third direction substantially perpendicular to the first and second directions. The first engaging portion includes a resiliently deformable shank and an engaging claw disposed at one end of the shank. The shank with the engaging claw is adapted to be inserted into the substantially cylindrical engaging hole, so that the engaging claw moves in sliding contact along an inner wall of the engaging hole while the shank is resiliently deformed in the third direction toward the axis of the engaging hole. The shank resiliently recovers in the direction of its original, unloaded configuration to move the engaging claw in the third direction away from the engaging hole axis, so that the engaging claw engages the engaging surface surrounding the engaging hole. The engaging claw then opposes the engaging surface in the first direction when the engaging claw moves beyond the engaging surface.

Therefore, by moving the cover toward the throttle body in the first direction while the engaging member is inserted into the substantially cylindrical engaging hole the engaging claw automatically engages the engaging surface so that the cover is securely coupled to the throttle body. After engagement with the engaging surface, the engaging claw is reliably prevented from being moved in the second direction by the engaging surface around the engaging hole.

Preferably, the shank comprises a pair of shank portions that are formed integrally with one of the throttle body and the cover and extend in the first direction therefrom. The shank portions are spaced from each other in the third direction. The engaging claw comprises a pair of claw portions. The claw portions are formed integrally with the respective ends of the shank portions and extend in the third direction. With this arrangement, the shank portion can be reliably resiliently deformed and then can recover towards its original, unloaded configuration.

The prevention means may be a wall portion that is formed integrally with the other of the throttle body and the cover. The wall portion may be formed on the side of the engaging surface and surround the engaging claw in the location where the engaging claw engages the engaging surface. With this arrangement, the prevention means can be readily constructed.

Preferably, the wall portion is spaced apart from the engaging claw by a small clearance so as to not interfere with the operation of the engaging claw. Therefore, the assembly operation will not be restricted by interference of the engaging claw with the wall portion.

In another embodiment of the present invention, the second engaging portion includes an engaging recess. The engaging recess may be formed in an outer surface of the other of the throttle body and the cover and extends in a direction substantially perpendicular to the first or second direction. The first engaging portion may include an engaging claw engageable with the engaging recess. The first engaging portion is resiliently deformed along the outer surface of the other of the throttle body and the cover and then recovers towards its original, unloaded configuration in order to engage the engaging recess by the engaging claw as the throttle body and the cover move toward each other in the first direction.

Also with this arrangement, the engaging claw may automatically engage with the engaging recess as the cover is moved toward the throttle body in the first direction. This allows a simplified procedure in order to mount the cover to the throttle body.

For example, the engaging recess has an open end and a closed end opposite to the open end, and the open end is open at the outer surface of the other of the throttle body and the cover. The result is that the engaging recess may have a simple configuration.

Preferably, the first engaging portion is formed integrally with one of the throttle body and the cover and has a substantially L-shaped configuration.

The prevention means may include a wall portion that is formed integrally with the other of the throttle body and the cover and the wall portion defines at least a part of the engaging recess. Using this arrangement, the prevention means can be readily constructed.

Preferably, the wall portion has an outer surface that extends substantially flush with an outer surface of the first engaging portion when the engaging claw engages the engaging recess. Therefore, the wall portion does not protrude outward from the outer surface of the throttle body or the cover. As a result, the wall portion does not substantially affect the appearance of the throttle device.

In another embodiment of the present invention, the throttle device includes a biasing member for loading the throttle body and the cover in the second direction apart from each other while in an engaged position so that the engagement between the first and second engaging members can be frictionally maintained.

With this arrangement, the engagement between the first and second engaging portions can be reliably maintained and any rattling between the throttle body and the cover can be minimized.

Preferably, the biasing device is a resilient member that is interposed between the throttle body and the cover. For example, the resilient member may be an O-ring or a leaf spring. Ideally, the resilient member is an O-ring that can also serve to provide a seal between the throttle body and the cover.

In another embodiment of the present invention, a plurality of the coupling devices are arranged in the circumferential direction of the throttle body or the cover and are spaced from each other by an appropriate distance in the circumferential direction. With this arrangement, the throttle body and the cover can be coupled to each other at plural positions in the circumferential direction. Therefore, the cover can be reliably coupled to the throttle body. The biasing means also may be provided at plural positions corresponding to the coupling devices.

BRIEF DESCRIPTION OF THE DRAWINGS

Additional objects, features and advantages of the present invention will be readily understood after reading the following detailed description together with the claims and the accompanying drawings, in which:

DESCRIPTION OF THE PREFERRED EMBODIMENTS

A throttle device according to embodiments of the present invention will be described with reference to the drawings.

[First Representative Embodiment]

A first representative embodiment of the present invention will be described with reference to FIGS. 1 to 6. First, a throttle device will be described in general. The throttle device of this embodiment is formed as an electronic-control type throttle device for controlling the throttle valve opening in response to signals from an engine control unit (ECU) of an automobile (not shown), including, but not limited to signals such as an acceleration signal related to an accelerator pedal depression amount, a traction control signal, a constant-speed traveling signal such as from a cruise control device, and an idling speed control signal.

Figure 1:
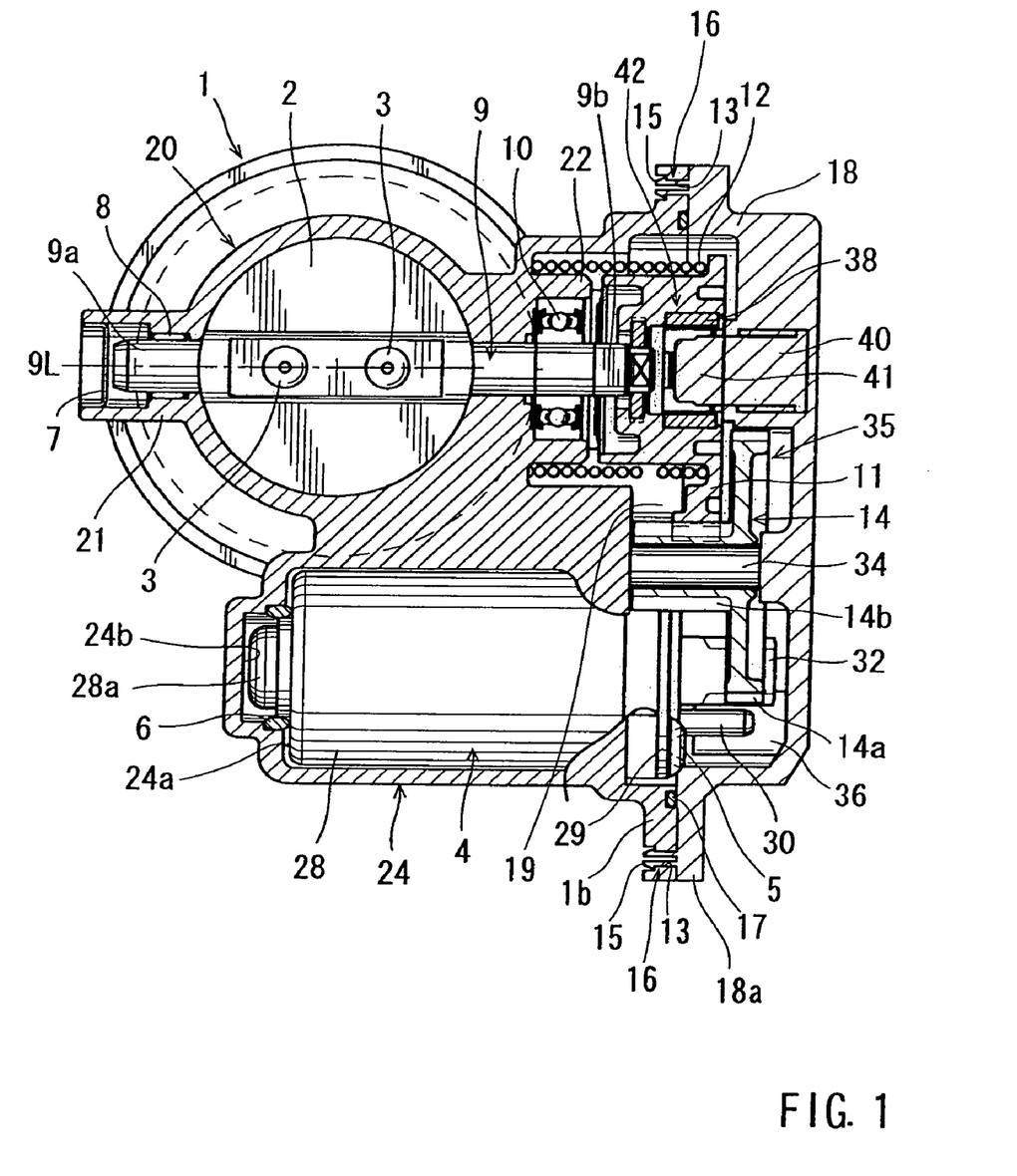
FIG. 1 is a cross-sectional view of a throttle device according to a first embodiment of the present invention.
Figure 2:
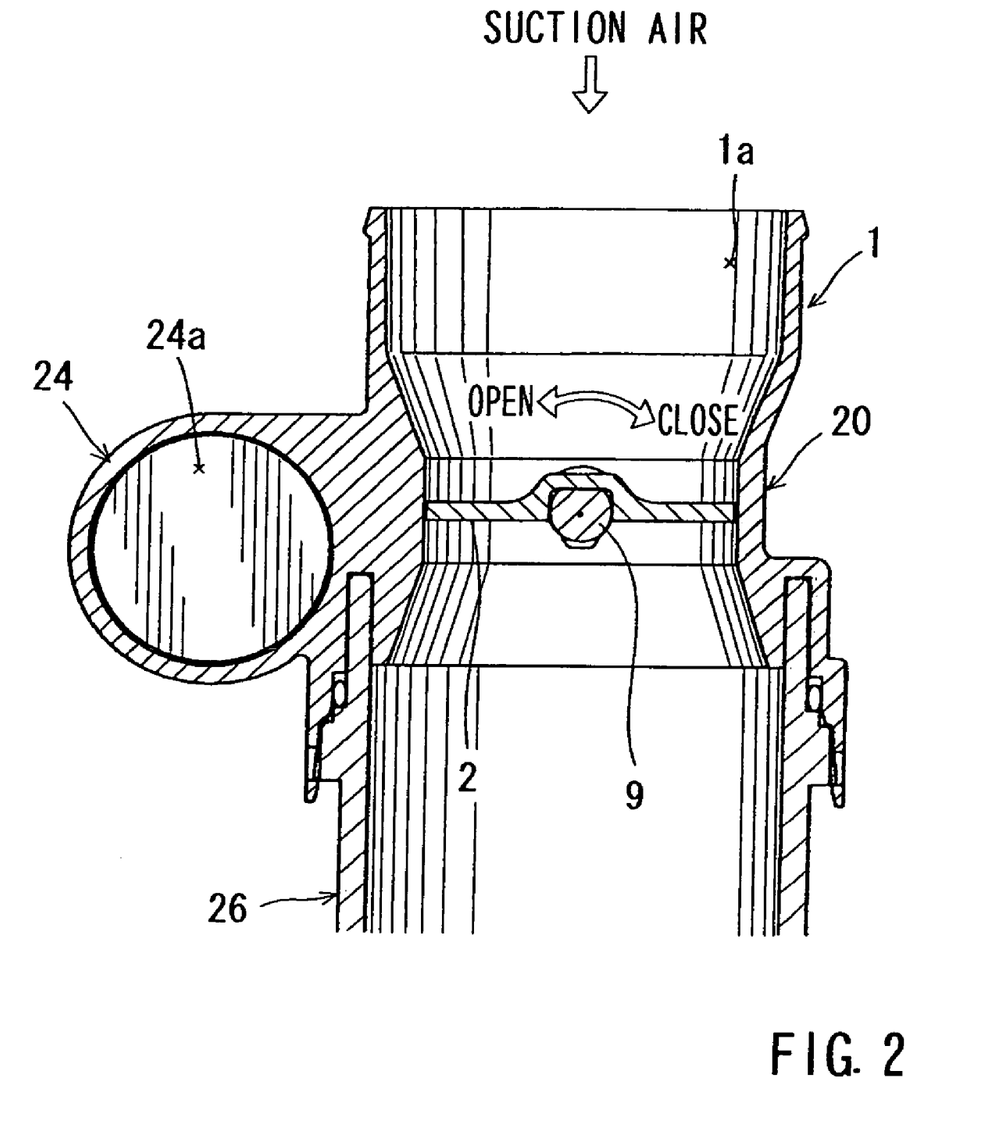
FIG. 2 is a vertical sectional view of the throttle device of FIG. 1.

Referring to FIGS. 1 and 2, the throttle device of this embodiment is equipped with a throttle body 1. The throttle body 1 is equipped with a main body portion 20 and a motor housing portion 24, which may be formed as an integral unit using resin. As shown in FIG. 2, formed in the main body portion 20 is a substantially cylindrical intake passage 1a extending vertically as viewed in the FIG. 2. Further, in FIG. 2, an air cleaner (not shown) is connected to an upper portion of the main body portion 20, and an intake manifold 26 is connected to a lower portion thereof.

Figure 4:
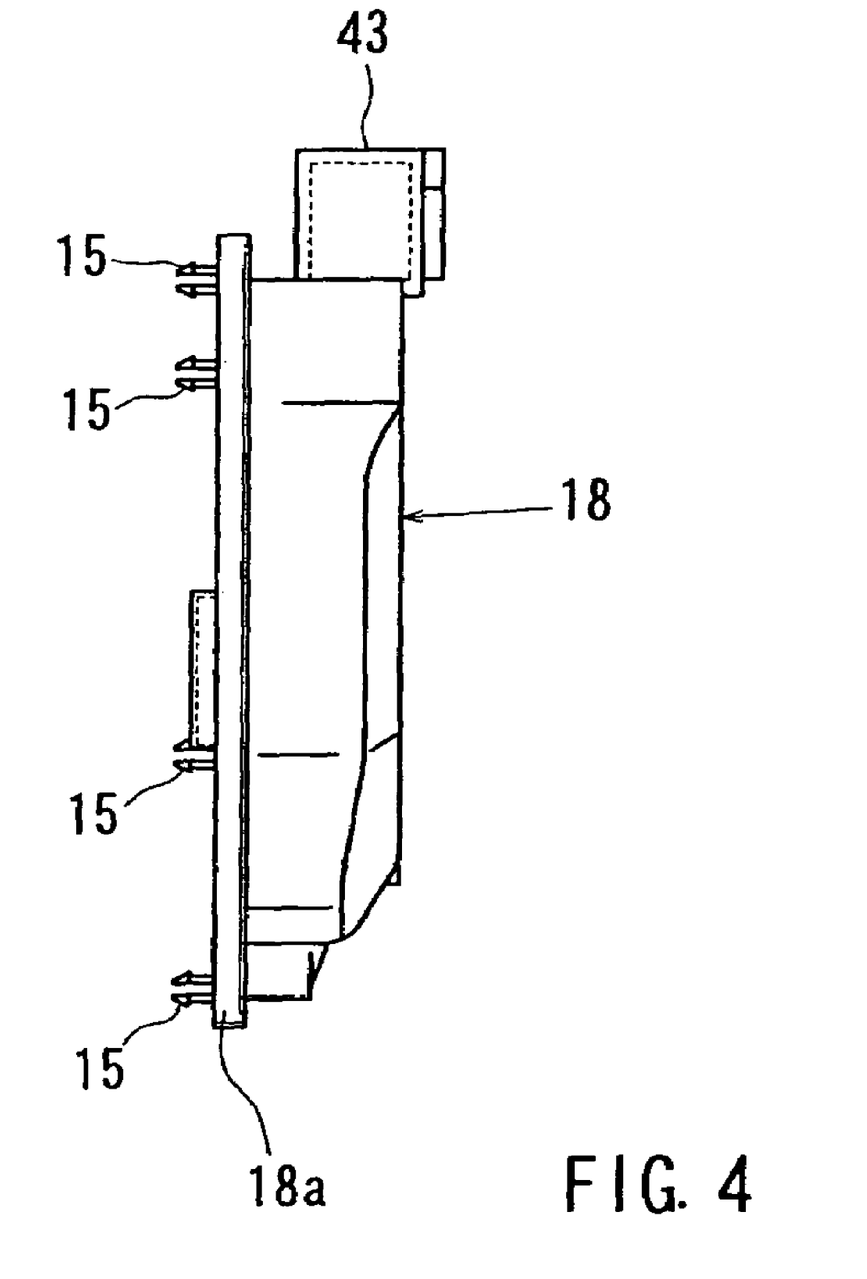
FIG. 4 is a side view of the cover.

Referring to FIGS. 1 and 4, in the main body portion 20, there is mounted a metal throttle shaft 9 radially extending across the intake passage 1a (See FIG. 1). As shown in FIG. 1, bearing portions 21 and 22 through the intermediation of bearings 8 and 10 rotatably supports end portions 9a and 9b, respectively, of the throttle shaft 9. The bearing portions 21 and 22 are formed integrally with the main body portion 20. A throttle valve 2, made of resin for example, is fixed to the throttle shaft 9, possibly by means of a plurality of rivets 3 as shown. The throttle valve 2, which is situated inside the intake passage 1a (see FIG. 2), rotates so as to close the intake passage 1a as the throttle shaft 9 rotates in one direction, and rotates so as to open the intake passage 1a as the throttle shaft 9 rotates in the other direction. These incremental opening and closing movements of the throttle valve 2 controls the amount of intake air flowing through the intake passage 1a. In FIG. 2, the throttle valve 2 is in a fully closed position. When the throttle valve in the fully closed position is rotated counterclockwise, as viewed in FIG. 2, the intake passage 1a is opened.

A plug 7 for confining the end portion 9a within the main body portion 20 is fitted into the bearing portion 21. Bearing portion 21 supports one end portion 9a (the left-hand end as seen in FIG. 1) of the throttle shaft 9. The other end portion 9b (the right-hand end as seen in FIG. 1) of the throttle shaft 9 extends through the bearing portion 22 and protrudes further to the right. A throttle gear 11 consisting of a sector gear is fixed to the protruding end of this end portion 9b so as not to allow relative rotation. A spring force, such as a torsion coil spring 12, is provided between the outer peripheral portion of the bearing portion 22 of the throttle body 1 and the outer peripheral portion of the throttle gear 11. This torsion coil spring 12 always urges the throttle valve 2 so as to close it through the throttle gear 11 and the throttle shaft 9. Further, although not shown, provided between the throttle body 1 and the throttle gear 11 is a stopper for preventing the throttle valve 2 from rotating in the closing direction beyond the fully closed position.

As shown in FIG. 1, the motor housing portion 24 of the throttle body 1 is formed in a cylindrical configuration having an axis substantially parallel with an axis 9L of the throttle shaft 9. One axial end (the left-hand end as seen in the drawing) of the motor housing 24 is closed. The interior of the motor housing portion 24 defines a space 24a. The space 24a is open on the right-hand side of the throttle body 1 and communicates with a gear chamber 19 that is defined between the throttle body 1 and a cover 18. The space 24a accommodates a motor 4 that may be, for example, a DC motor. In the accommodation state as shown, the axis of the motor 4 extends parallel to the axis 9L of the throttle shaft 9. An output shaft 4a (See FIG. 3) of the motor 4 is positioned to the right, as seen in FIG. 1, and extends into the gear chamber 19. The motor 4 has a motor casing 28 that defines an outer surface of the motor 4. Provided on the right-hand side of the motor casing 28 is a mounting flange 29, which is fastened to the motor housing portion 24, preferably by means of a plurality of screws 5 (See FIG. 3).

The motor casing 28 has an end portion 28a that has a diameter smaller than the diameter of the motor casing 28. The motor casing 28 as well as the end portion 28a is spaced apart from an inner wall of the space 24a by a predetermined distance. The space 24a includes a stepped, substantially cylindrical cavity 24a that receives the end portion 28a of the motor casing 28. The end portion 28a is supported resiliently with respect to the radial direction by an inner circumferential wall of the stepped cylindrical cavity 24a via a resilient support member 6, such as an O-ring (see FIG. 1).

Figure 3:
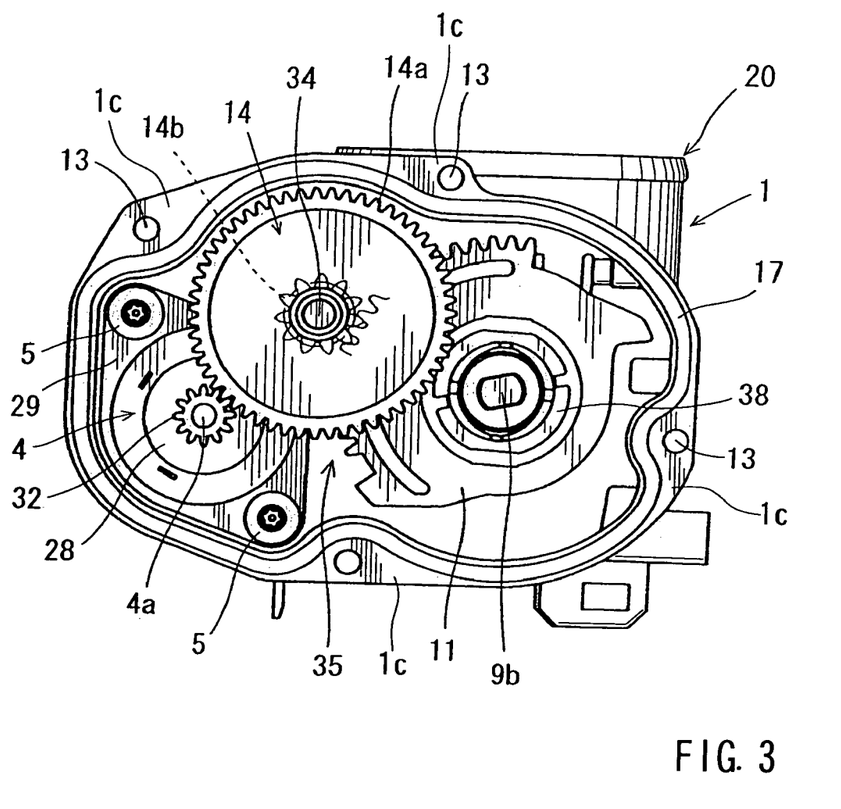
FIG. 3 is a side view of the throttle device, with its cover removed.

The output shaft 4a of the motor 4 protrudes to the right as seen in FIG. 1 beyond the mounting flange 29, and a motor pinion 32 is fastened to this protruding portion (See FIG. 3). Further, as shown in FIG. 1, a counter shaft 34 is mounted to the throttle body 1 at a position between the main body portion 20 and the motor housing portion 24. The counter shaft 34 extends parallel to the axis 9L of the throttle shaft 9. A counter gear 14 is rotatably mounted to the counter shaft 34. The counter gear 14 has two gear portions 14a and 14b having different gear diameters. The large diameter gear portion 14a is in mesh with the motor pinion 32, and the small diameter gear portion 14b is in mesh with the throttle gear 11 (See FIGS. 1 and 3). The motor pinion 32, the counter gear 14, and the throttle gear 11 constitute a speed reduction gear mechanism 35.

The cover 18 primarily covers the speed reduction gear mechanism 35. The gear chamber 19 is defined between a lateral portion (right portion as viewed in FIG. 1) of the throttle body 1 and the cover 18. The cover 18 is open on a side opposing the throttle body 1 and has an end portion 18a that defines the opening. A mount portion 1b is formed on the lateral portion of the throttle body 1 and defines an opening. The cover 18 is coupled to the throttle body 1 with the end portion 18a contacting the mount portion 1b of the throttle body 1. More specifically, the end portion 18a and the mount portion 18a are coupled by means of a snap fit mechanism 16 that includes a plurality of engaging holes 13 and a plurality of engaging members 15. The engaging holes 13 are formed in the mount portion 1b of the throttle body 1. The engaging members 15 extend from the end portion 18a of the cover 18 and are adapted to be inserted into the corresponding engaging holes 13, so that the engaging members 15 are resiliently deformed and engaged within the corresponding engaging holes 13 as will be hereinafter described. Here, the direction of insertion of the engaging members 15 into the corresponding engaging holes 13 is substantially perpendicular to the plane where the end portion 18a of the cover 18 and the mount portion 1b of the throttle body 1 contact each other.

Referring to FIG. 3, the mount portion 1b of the throttle body 1 has a plurality of flat regions 1c that are spaced apart from each other in the circumferential direction of the end portion 18a. The engaging holes 13 are formed to extend through the respective flat regions 1c (see FIG. 5). Preferably, the engaging holes 13 may be formed at the same time that the throttle body 1 is molded of resin. The engaging members 15 are formed integrally with the end portion 18a of the cover 18 and are positioned to correspond to the opposing engaging holes 13. Also, the engaging members 15 may be formed at the same time that the cover 18 is molded of resin.

Figure 5:
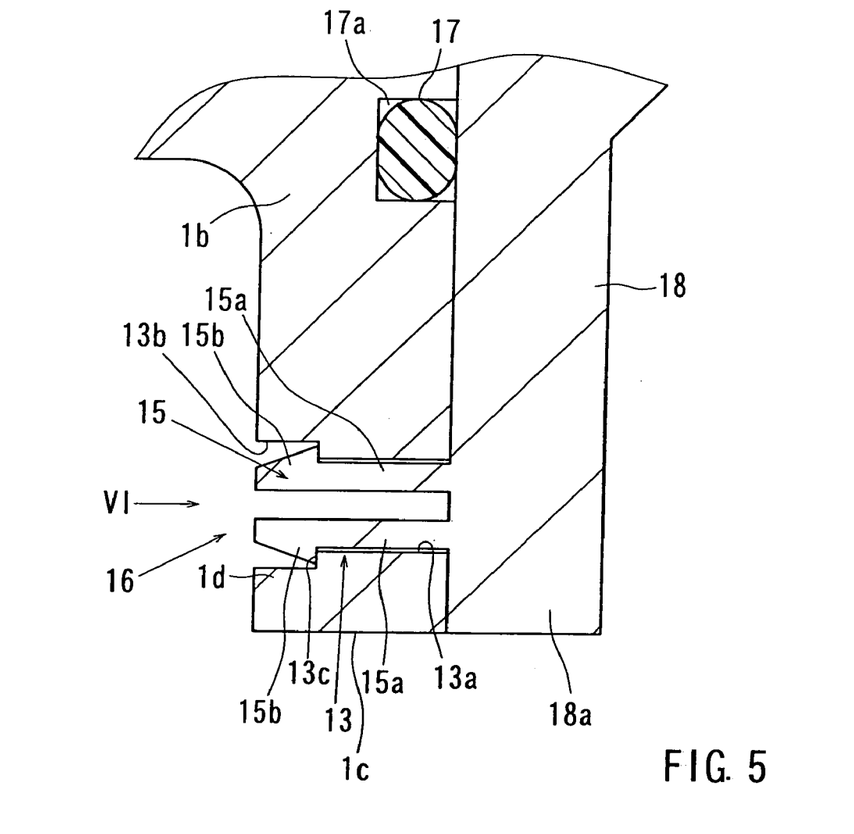
FIG. 5 is an enlarged cross sectional view showing one of snap-fit coupling devices for coupling the cover to a throttle body.
Figure 6:
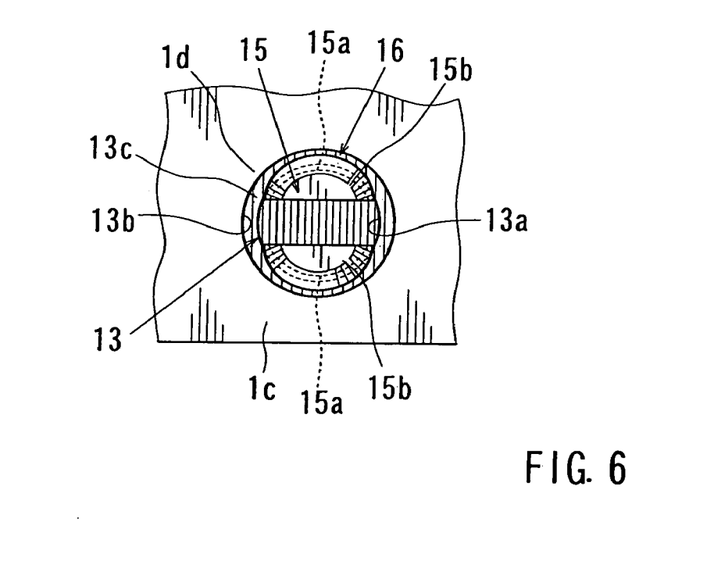
FIG. 6 is a view as viewed in a direction indicated by an arrow VI in FIG. 5.

Referring to FIGS. 5 and 6, a part of the snap fit mechanism 15 is shown in enlarged views. Only one engaging hole 13 and its related engaging member 15 will be explained in detail due to the reason that all of the engaging holes 13 have similar features and all of the engaging members 15 have similar features as well.

The engaging hole 13 is a stepped hole having a small diameter portion 13a and a large diameter portion 13b, both regions having substantially circular cross sections. The small diameter portion 13a is positioned on the side of initial insertion of engaging member 15; and the large diameter portion 13a is positioned on the side opposite to the insertion side. An engaging surface 13c is defined between the small diameter portion 13a and the large diameter portion 13b, orthogonal to the axis of the holes. Thus, the engaging surface 13c is positioned at an intermediate position in the axial direction of the engaging hole 13 and extends substantially perpendicular to the inserting direction of the engaging member 15.

Referring again to FIGS. 5 and 6, the engaging member 15 includes a pair of shank portions 15a. Each of the shank portions 15a has an integrally formed engaging claw 15b. Each of the shank portions 15a has a substantially semicircular cross section perpendicular to the axial direction and has an axial length that corresponds (at least approximately equal) to the axial length of the small diameter portion 13a. The outer peripheral surfaces of the shank portions 15a jointly define a substantially cylindrical plane that has a slightly smaller diameter than the diameter of the small diameter portion 13a.

The engaging claws 15b have an axial length that is approximately equal to the axial length of the large diameter portion 13b. The engaging claws 15b are tapered relative to the insertion direction, so that the engaging claws 15b can be easily inserted into the engaging hole 13. More specifically, the outer surfaces of the engaging claws 15b jointly define a tubular plane that has a substantially elliptical cross section in a direction perpendicular to the axial direction. The tubular plane has a maximum cross sectional area in a position adjacent to the shank portions 15a. In this position, the length along the minor axis of the elliptical cross section is slightly smaller than the diameter of the small diameter portion 13a of the engaging hole 13 and is equal to the diameter of the cylindrical plane defined by the shank portions 15a. The length along the major axis of the elliptical cross section is greater than the diameter of the small diameter portion 13a but is slightly smaller than the diameter of the large diameter portion 13b, so that the inner wall of the large diameter portion 13b does not interfere with the engaging claws 15b.

As the engaging member 15 is inserted into the engaging hole 13 from the side of the small diameter portion 13a, the engaging claws 15b may be pressed against the inner wall of the small diameter portion 13a, so that the shank portions 15a are resiliently deformed in a radial direction toward each other. When the engaging claws 15b move into the large diameter portion 13b beyond the small diameter portion 13a, the engaging claws 15a resiliently recover toward their original configurations. As a result, the right ends (as viewed in FIG. 5) of the engaging claws 15b are opposed to the engaging surface 13c as shown in FIG. 5, restricting removal of the cover due to the contact between engaging member 15 and engaging hole 13.

In the engaging state shown in FIG. 6, the engaging claws 15b of the engaging member 15 are positioned within the large diameter portion 13b of the engaging hole 13. More specifically, the engaging claws 15b are surrounded by a wall portion 1d of the mount portion 1b that defines the large diameter portion 13b. In addition, the inner wall of the large diameter portion 13b does not interfere with the engaging claws 15b due to clearance provided between the inner wall of the large diameter portion 13b and the outer peripheral dimensions of engaging claws 15b in the engaged state.

Therefore, it is not convenient to apply an effective force to the engaging claws 15b in an attempt to disengage the engaging member 15 from the engaging hole 13. Even if a user of the throttle device has inserted a conventional tool, such as a screwdriver, into the large diameter portion 13b of the engaging hole 13, the configuration of the engaging claws 15b within the large diameter portion 13b cavity makes the simultaneous disengagement of both claws difficult. As a result, the engaging member 15 is inhibited from being intentionally disengaged from the engaging hole 13. The position of the engaging claws 15b within the cavity formed by large diameter portion 13b additionally reduces the ability of an accidental application of force from reaching or affecting the engagement of the engaging claws 15b.

Due to a plurality of engaging members 15 being engaged with their corresponding engaging holes 13 in this embodiment, the cover 18 can be reliably coupled to the throttle body 1 and the intentional removal of the cover 18 from the throttle body 1 can be effectively inhibited.

As an additional feature of this embodiment, an annular seal member 17 is interposed between the end portion 18a and the mount portion 1b and extends around the entire circumferential length of the end portion 18a and the mount portion 1b. Therefore, water or dust may be inhibited from entering the gear chamber 19. In this embodiment, the seal member 17 is fitted into a circumferential recess 17a formed in the mount portion 1b. Alternatively, the seal member 17 may be fitted into a circumferential recess (not shown) formed in the end portion 18a. Preferably, the seal member 17 may be an O-ring that is made of resilient material, e.g., rubber. The seal member 17 may be compressed between the end portion 18a and the mount portion 1b, causing the seal member 17 to apply a biasing force to urge the end portion 18a and the mount portion 1b away from each other in the second direction. Applied between these components in either position, the seal member 17 serves as a biasing member. The biasing force may load the rear ends of the engaging claws 15b of each engaging member 15 against the engaging surface 13c of the corresponding engaging hole 13. Due to this loading, the engaging state can be reliably maintained without vibration induced noise typically caused by loose components intermittently contacting each other.

Further, the motor 4 has a motor terminal 30 protruding from the mounting flange 29, and this motor terminal 30 is electrically connected to a battery (not shown) and, further, to the ECU by way of a relay terminal (not shown) of a relay connector 36 provided in the cover 18. Thus, the motor 4 is driven in accordance with an acceleration signal related to accelerator pedal depression amount, a traction control signal, a constant-speed traveling signal, and an idling speed control signal, etc. The driving force of the motor 4 is transmitted to the throttle shaft 9 through the speed reduction gear mechanism 35, that is, through the motor pinion 32, the counter gear 14, and the throttle gear 11.

A ring-shaped magnet 38 is provided on the right-hand side surface of the throttle gear 11. This magnet 38 has a pair of semi-arcuate magnet segments exhibiting different polarities. Inside the cover 18, there is mounted a circuit board 40 opposed to the end surface of the throttle shaft 9. Mounted on the circuit board 40 is a Hall effect element 41 situated inside the magnet 38. When the throttle gear 11 rotates with the throttle shaft 9, the Hall element 41 detects a change in the magnetic field due to the magnet 38, and generates a Hall voltage. The Hall voltage generated by the Hall element 41 is input to the ECU by way of the circuit board 40 and the connector (not shown) provided in the cover 18. The ECU determines the throttle opening according to the change in the magnetic field of the magnet 38 as a magnetic physical quantity, and performs various control operations, such as fuel injection control, correction control on the opening of the throttle valve 2, and gear change control for automatic transmission, according to the vehicle speed detected by a vehicle speed sensor (not shown), etc. The magnet 38, the circuit board 40, and the Hall element 41 constitute a throttle sensor 42.

In this embodiment, the speed reduction gear mechanism 35 and the throttle sensor 42 are disposed within the gear chamber 19 and are covered from the outside by the cover 18.

In the above-described throttle device, when the engine is started, drive control is performed on the motor 4 based on a signal from the ECU, whereby as described above, the throttle valve 2 is incrementally opened or closed through the speed reduction gear mechanism 35, with the result being that the amount of intake air flowing through the intake passage 1a of the throttle body 1 is controlled.

In this embodiment, the cover 18 is coupled to the throttle body 1 by the snap fit mechanism 16 that includes a plurality of engaging holes 13 and the engaging members 15. In order to couple the cover 18 to the throttle body 1, it is only necessary to (1) position the cover 18 relative to the throttle body 1, so that the engaging members 15 are oppose to the respective engaging holes 13, and (2) insert the engaging members 15 into the respective engaging holes 13. Therefore, the mounting operation of the cover 18 to the throttle body 1 can be relatively easily performed in one step in comparison to a conventional mounting operation using separate fastening means. As a result, the assembly operational efficiency may be improved. In addition, because the engaging members 15 are formed integrally with the cover 18, the number of parts can be minimized and the associated manufacturing costs can be reduced in comparison to the conventional mounting structure.

In addition, in this embodiment, the seal member 17 is disposed between the end portion 18a of the cover 18 and the mount portion 1b of the throttle body 1 when the cover 18 is mounted to the throttle body 1. The seal member 17 serves to press the engaging claws 15b of the engaging members 15 against the engaging surfaces 13c of the engaging holes 13. The result is that a single seal member 17 can provide the seal between the throttle body 1 and the cover 18 as well as inhibit the potential vibration induced chattering of the cover 18 against the throttle body 1.

However, if the cover 18 is removed in any event from throttle body 1 and is then remounted, there exists a possibility that the relative positions between the magnet 38 on the throttle body side and the Hall effect element 41 on the cover side can become out of sync with each other. In such a case, the throttle sensor 42 may output improper throttle valve angle signals.

To guard against this problem, the engaging claws 15b are inhibited from being disengaged because the wall portion 1d of the mount portion 1b encloses the engaging claws 15b such that the engaging claws 15b cannot be readily accessed either manually or by conventional tools. Therefore, after the throttle device, with the cover 18 mounted to the throttle body 1 according to the above description, has been shipped to a user; the user is restricted from easily removing the cover 18 from the throttle body 1. Accordingly, the possibility of improper output signals due to user intervention is reduced. In addition, the snap fit mechanism 16 of this embodiment serves to secure the cover 18 in position relative to the throttle body 1 about the entire circumferential direction.

[Second Representative Embodiment]

Figure 7:
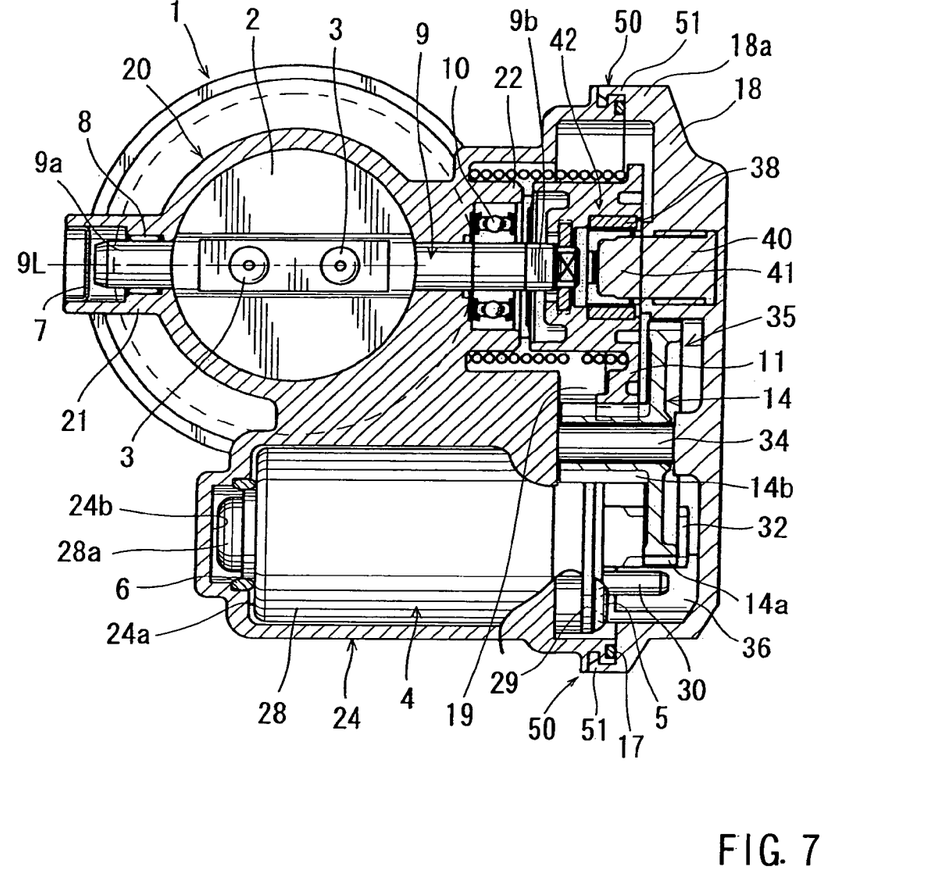
FIG. 7 is a cross-sectional view of a throttle device according to a second embodiment of the present invention.

A second embodiment of the present invention will be described with reference to FIGS. 7, 8, and 9. The second embodiment is an alternative of the first embodiment and is different from the first embodiment primarily in the type of snap fit mechanism used. Therefore, in FIGS. 7, 8, and 9, members identical to the first embodiment are given the same reference numbers, and the description of these members will be omitted.

A snap fit mechanism 50 of the second embodiment includes a plurality of engaging members 51 and a plurality of engaging recesses 53. The engaging members 51 are formed integrally with the end portion 18a of the cover 18. The engaging members 51 are spaced uniformly around the circumferential direction of the end portion 18a. The engaging recesses 53 are formed in the mount portion 1b of the throttle body 1 and are adapted to engage corresponding engaging members 51.

Because the engaging members 51 have the similar construction with each other and the engaging recesses 53 have the similar configurations to each other as well, a detailed description will be made of only one representative engaging member 51 and only one representative engaging recess 53.

Figure 8:
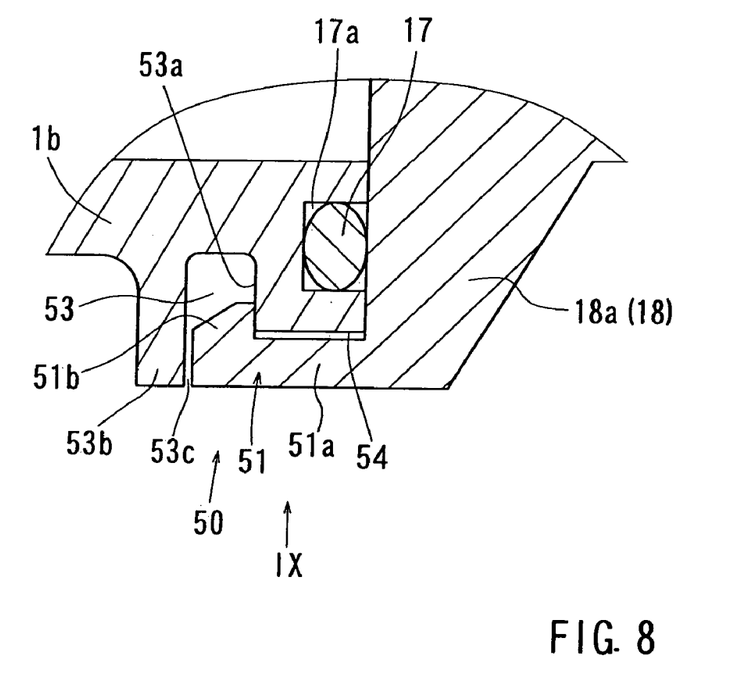
FIG. 8 is an enlarged cross sectional view showing one of snap-fit coupling devices for coupling the cover to the throttle body.
Figure 9:
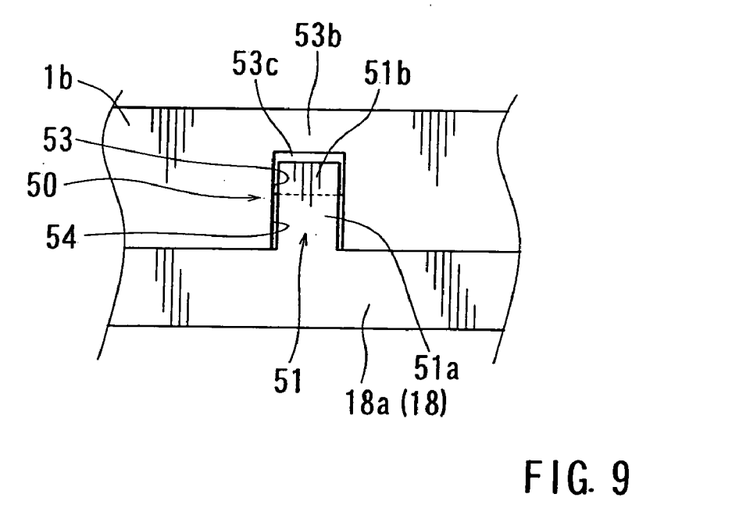
FIG. 9 is a view as viewed in a direction indicated by an arrow IX in FIG. 8.

As shown in FIG. 8, the engaging member 51a has a base portion 51a that extends in a fitting direction away from the cover 18 and towards the throttle body 1 (the left direction as viewed in FIG. 8). The base portion 51a is resiliently deformable in a direction substantially perpendicular to the fitting direction. An engaging claw 51b is formed at one end of the base portion (the left end as viewed in FIG. 8). The engaging recess 53 extends from the outer peripheral surface of the mount portion 1b in a direction toward the gear chamber 19, a direction substantially perpendicular to the fitting direction, so that a lock surface 53a on the side of the cover 18 is defined in the engaging recess 53 in order to oppose the engaging claw 51b, thereby inhibiting movement in the second direction opposite to the fitting or first direction. As the cover 18 is moved to be fitted with the throttle body 1, the engaging claw 51b slides along the outer peripheral surface of the mount portion 1b while the base portion 51a is resiliently deformed outward due to contact between the engaging claw 51b and the outer peripheral surface of the mount portion 1b. Because of this, the front end of the engaging claw 51b is chamfered in order to allow the engaging claw 51b to smoothly ride over the outer peripheral surface of the mount portion 1b. When the engaging recess 53 reaches a position slightly beyond alignment with the engaging recess 53, the base portion 51a recovers towards its original configuration, so that the engaging claw 51b automatically engages the engaging recess 53. In order to provide a guide for the movement of the engaging claw 51b along the outer peripheral surface of the mount portion 1b, a guide recess 54 is formed in the outer peripheral surface of the mount portion 1b.

Therefore, in order to mount the cover 18 to the throttle body 1, the cover 18 is positioned such that the engaging claws 51b of the engaging members 51 are in alignment with the corresponding guide recesses 54 of throttle body 1. The cover 18 is subsequently moved toward the mount portion 1d of the throttle body 1, so that the engaging claws 51b slide along the corresponding guide recesses 54 while the base portions 51a are resiliently deformed outward. When the engaging claws 51b are brought slightly passed alignment with the corresponding engaging recesses 53, the base portions 51a resiliently recover towards their unloaded configurations so that the engaging claws 51b automatically engage with the corresponding engaging recesses 53.

In this engaging position, the lock surfaces 53a are opposite to the corresponding engaging claws 51b in the fitting direction (first direction). As a result, the engaging members 51 being engaged to engaging recesses 53 may prevent the removal of cover 18, even if an attempt is made to move cover 18 in the second direction opposite to the fitting direction. In this way, the cover 18 can be securely mounted to the throttle body 1 through various engagements between the engaging members 51 and the engaging recesses 53. In addition, each engaging recess 53 is defined by a wall portion 53b that is a part of the mount portion 1b. The wall portion 53b is formed in such a way so as to surround the engaging recess 53 and has an outer surface that extends flush with the outer peripheral surface of the mount portion 1b. In the engaging position, the outer surface of the engaging member 51 is substantially flush with the outer surface of the wall portion 53b. Further, the front end of the engaging claw 51b is spaced apart from the wall portion 51b by a relatively small clearance 53c in the fitting direction. Therefore, engaging claw 51b may be prevented from being easily accessed by a standard tool or a finger of a person in attempting to remove the engaging claw 51b from the engaging recess 53. The overall result being that the accidental and unauthorized intentional removal of the cover 18 from the throttle body 1 is effectively inhibited.

The second embodiment has many of the same advantages and benefits of the first embodiment. Additionally however, because the guide recesses 54 are formed in the mount portion 1d, the guide recesses 54 may serve as a device for correctly orienting the relative positions in the circumferential direction of the throttle body 1 and the cover 18. Further, because the outer surfaces of the engaging members 51, particularly the outer surfaces of the base portions 51a of the engaging members 51 extend substantially flush with the mount portion 1d as well as the wall portions 53b, unrestricted access to the base portions 51a for attempting removal of the engaging members 51 is reliably inhibited.

The present invention is not limited to the embodiments described above but may be modified in various ways without departing from the scope of the invention as defined by the appended claims.

Figure 10:
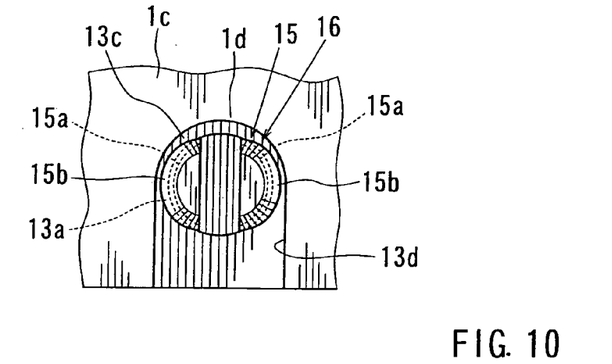
FIG. 10 is a view similar to FIG. 6, but showing an alternative embodiment of a wall part for preventing access to the coupling device.

For example, although the wall portion 1d for restricting access to the engaging claws 15b is formed to entirely surround the engaging claws 15b in the first embodiment, the wall portion 1d may only partly surround the engaging claws 15b as shown in FIG. 10. In the design shown in FIG. 10, the engaging hole 13 has a communication recess 13d that extends to open at an edge of the corresponding flat region 1c. The communication recess 13d may have a bottom surface that extends substantially flush to the level of the engaging surface 13c.

Figure 11:
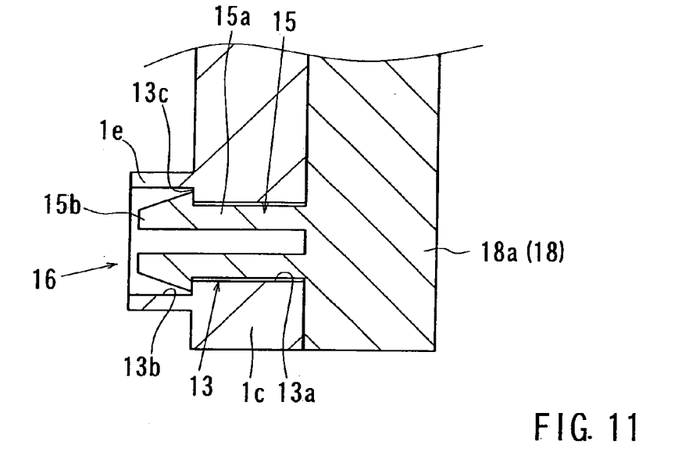
FIG. 11 is a view similar to FIG. 5, but showing another alternative embodiment of the wall part.

In another modification of the first embodiment, the wall portion 1d may be replaced with a tubular extension 1e that is formed integrally with the corresponding flat region 1c as shown in FIG. 11. The tubular extension 1e may entirely surround the engaging claws 15b, with a small circumferential clearance provided between the inner wall of the tubular extension 1e and the outer peripheral dimension of the engaging claws 15b.

Figure 12:
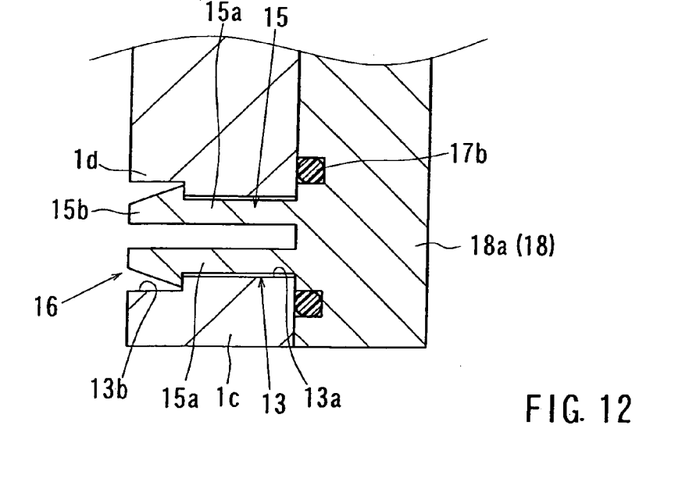
FIG. 12 is a view similar to FIG. 5, but showing an alternative embodiment of a biasing member for pressing an engaging claw against an engaging surface of the coupling device.

In another modification of the first embodiment, in order to load the engaging claws 15b against the engaging surface 13c, in addition to or in place of the seal member 17, a rubber ring 17b may be interposed around each engaging member 15 between the mount portion 1d of the throttle body 1 and the end portion 18a of the cover 18, as shown in FIG. 12. The rubber ring 17b may be replaced with a spring force, such as a metal leaf spring.

Further, although in the above first and second embodiments, the wall portion 1d (53b) is provided for each of the snap fit devices 16 (50), it may be sufficient if the wall portion 1d (53b) is provided for at least one of the snap fit devices 16 (50). Further, although the engaging member 15 of the first embodiment has a pair of shank portions 15a with respective engaging claws 15b, three or more individual shank portions each having an engaging claw may be provided. Additionally, a single shank portion with an engaging claw may be provided.

Furthermore, although the engaging holes 13 are formed in the throttle body 1 and the engaging members 15 are provided on the cover 18 in the first embodiment, the engaging holes 13 may be formed in the cover 18 and the engaging members 15 may be provided on the throttle body 1. A corresponding combination of engagement holes 13 and engaging members 15 may be provided so that both holes and members exist on the throttle body 1 as well as on the cover 18. Similarly, although the engaging recesses 53 are shown as being formed in the throttle body 1 and the engaging members 51 are provided on the cover 18 in the second embodiment, the engaging recesses 53 may be formed in the cover 18 and the engaging members 51 may be provided on the throttle body 1. A corresponding combination of engagement recesses 53 and engaging members can be provided so that both recesses and members exist on the throttle body 1 as well as on the cover 18.

Furthermore, the biasing members, such as the seal member 17 in the first embodiment and the rubber ring 17b of the alternative embodiment used for loading the engaging claws 15b (51b) against the engaging surfaces 13c (53a), may be eliminated if desired.

Furthermore, although the throttle body 1 in the first and second embodiments may be formed of resin, the throttle body 1 may be made of another material, such as aluminum alloy. Similarly, although the throttle valve 2 and the cover 18 may be formed integrally of resin, these elements may be made either integrally or separately from another material, such as metal.

What is claimed is:

1. A throttle device comprising:
   a throttle body;
   a cover adapted to be mounted to the throttle body;
   a coupling device comprising a first engaging portion disposed on one of the throttle body and the cover and a second engaging portion disposed on the other of the throttle body and the cover, wherein the first and second engaging portions are engageable with each other when the throttle body and the cover is moved toward each other in a first direction, so that the throttle body and the cover are prevented from moving away from each other in a second direction opposite to the first direction;
   means for preventing access to the first or second engaging portions in order to disengage the first and second engaging portions;
   wherein the first engaging portion is resiliently deformed and subsequently recovers towards the engaging portion's original configuration in order to engage the second engaging portion as the throttle body and the cover move together relative to each other in the first direction;
   wherein the prevention means is arranged and constructed to restrict the intentional operation of the first engaging member; wherein
   the second engaging portion includes an engaging hole that has an axis substantially parallel to the first and second directions;
   the engaging hole defines an engaging surface that extends in a third direction substantially perpendicular to the first and second directions;
   the first engaging portion includes at least one resiliently deformable shank and an engaging claw disposed at one end of each shank;
   the shank with the engaging claw is adapted to be inserted into the engaging hole, so that the engaging claw slides along an inner wall of the engaging hole while the shank is resiliently deformed inward in the third direction as the first engaging portion is inserted into the engaging hole; and
   the shank resiliently recovers towards the shank's original configuration to move the engaging claw outward in the third direction, so that the engaging claw engages the engaging hole with the engaging claw opposite the engaging surface in the first direction when the engaging claw moves beyond the engaging surface, wherein the shank comprises a pair of shank portions that are formed integrally with one of the throttle body and the cover and extend in the first direction therefrom, the shank portions are spaced apart from each other in the third direction and the engaging claw comprises a pair of claw portions, and the claw portions are formed integrally with the respective ends of the shank portions and extend in radially outward in the third direction.

2. A throttle device as in claim 1, further including a biasing device for biasing in the second direction the first engaging member and the second engaging member in the engaging positions, so that the engagement between the first and second engaging members is maintained in a loaded condition.

3. A throttle device as in claim 2, wherein the biasing device comprises a resilient member that is interposed between the throttle body and the cover.

4. A throttle device as in claim 3, wherein the resilient member is an O-ring.

5. A throttle device as in claim 1, wherein a plurality of the coupling devices are arranged in the circumferential direction of the throttle body or the cover and are spaced from each other by a uniformly in the circumferential direction.

6. A throttle device comprising:
   a throttle body;
   a cover adapted to be mounted to the throttle body;
   a coupling device comprising a first engaging portion disposed on one of the throttle body and the cover and a second engaging portion disposed on the other of the throttle body and the cover, wherein the first and second engaging portions are engageable with each other when the throttle body and the cover is moved toward each other in a first direction, so that the throttle body and the cover are prevented from moving away from each other in a second direction opposite to the first direction;
   means for preventing access to the first or second engaging portions in order to disengage the first and second engaging portions;
   wherein the first engaging portion is resiliently deformed and subsequently recovers towards the engaging portion's original configuration in order to engage the second engaging portion as the throttle body and the cover move together relative to each other in the first direction;
   wherein the prevention means is arranged and constructed to restrict the intentional operation of the first engaging member; wherein
   the second engaging portion includes an engaging hole that has an axis substantially parallel to the first and second directions;
   the engaging hole defines an engaging surface that extends in a third direction substantially perpendicular to the first and second directions;
   the first engaging portion includes at least one resiliently deformable shank and an engaging claw disposed at one end of each shank;
   the shank with the engaging claw is adapted to be inserted into the engaging hole, so that the engaging claw slides along an inner wall of the engaging hole while the shank is resiliently deformed inward in the third direction as the first engaging portion is inserted into the engaging hole; and
   the shank resiliently recovers towards the shank's original configuration to move the engaging claw outward in the third direction, so that the engaging claw engages the engaging hole with the engaging claw opposite the engaging surface in the first direction when the engaging claw moves beyond the engaging surface;
   wherein the prevention means comprises a wall portion that is formed integrally with the other of the throttle body and the cover, and the wall portion is arranged and constructed to surround the engaging claw when the engaging claw engages the engaging surface, and wherein the wall portion is spaced from the engaging claw by clearance so as to not interfere with the operation of the engaging claw.

7. A throttle device as in claim 6, further including a biasing device for biasing in the second direction the first engaging member and the second engaging member in the engaging positions, so that the engagement between the first and second engaging members is maintained in a loaded condition.

8. A throttle device as in claim 7, wherein the biasing device comprises a resilient member that is interposed between the throttle body and the cover.

9. A throttle device as in claim 8, wherein the resilient member is an O-ring.

10. A throttle device comprising:
a throttle body;
a cover adapted to be mounted to the throttle body;
a coupling device comprising a first engaging portion disposed on one of the throttle body and the cover and a second engaging portion disposed on the other of the throttle body and the cover, wherein the first and second engaging portions are engageable with each other when the throttle body and the cover is moved toward each other in a first direction, so that the throttle body and the cover are prevented from moving away from each other in a second direction opposite to the first direction;
means for preventing access to the first or second engaging portions in order to disengage the first and second engaging portions;
wherein the prevention means is arranged and constructed to restrict the intentional operation of the first engaging member;
wherein the second engaging portion includes an engaging recess formed in an outer surface of the other of the throttle body and the cover and extending in a direction substantially perpendicular to the first or second direction, the first engaging portion includes an engaging claw engageable with the engaging recess, and the first engaging portion is resiliently deformed along the outer surface of the other of the throttle body and the cover and then recovers towards the first engaging portion's original configuration in order to engage the engaging recess by the engaging claw as the throttle body and the cover move toward each other in the first direction, wherein the engaging recess has an open end and a closed end opposite to the open end, and the open end is open at the outer surface of the other of the throttle body and the cover.

11. A throttle device as in claim 10, wherein the first engaging portion is formed integrally with one of the throttle body and the cover and has a substantially L-shaped configuration.

12. A throttle device as in claim 10, further including a biasing device for biasing in the second direction the first engaging member and the second engaging member in the engaging positions, so that the engagement between the first and second engaging members is maintained in a loaded condition.

13. A throttle device as in claim 12, wherein the biasing device comprises a resilient member that is interposed between the throttle body and the cover.

14. A throttle device as in claim 13, wherein the resilient member is an O-ring.

15. A throttle device comprising:
a throttle body;
a cover adapted to be mounted to the throttle body;
a coupling device comprising a first engaging portion disposed on one of the throttle body and the cover and a second engaging portion disposed on the other of the throttle body and the cover, wherein the first and second engaging portions are engageable with each other when the throttle body and the cover is moved toward each other in a first direction, so that the throttle body and the cover are prevented from moving away from each other in a second direction opposite to the first direction;
means for preventing access to the first or second engaging portions in order to disengage the first and second engaging portions;
wherein the prevention means is arranged and constructed to restrict the intentional operation of the first engaging member;
wherein the second engaging portion includes an engaging recess formed in an outer surface of the other of the throttle body and the cover and extending in a direction substantially perpendicular to the first or second direction, the first engaging portion includes an engaging claw engageable with the engaging recess, and the first engaging portion is resiliently deformed along the outer surface of the other of the throttle body and the cover and then recovers towards the first engaging portion's original configuration in order to engage the engaging recess by the engaging claw as the throttle body and the cover move toward each other in the first direction;
wherein the prevention means comprises a wall portion that is formed integrally with the other of the throttle body and the cover and the wall portion defines at least a section of the engaging recess,
wherein the wall portion has an outer surface that extends substantially flush with an outer surface of the first engaging portion when the engaging claw engages the engaging recess.

16. A throttle device as in claim 15, further including a biasing device for biasing in the second direction the first engaging member and the second engaging member in the engaging positions, so that the engagement between the first and second engaging members is maintained in a loaded condition.

17. A throttle device as in claim 16, wherein the biasing device comprises a resilient member that is interposed between the throttle body and the cover.

18. A throttle device as in claim 17, wherein the resilient member is an O-ring.

* * * * *